United States Patent
Lee et al.

(10) Patent No.: US 11,620,058 B2
(45) Date of Patent: Apr. 4, 2023

(54) TEMPERATURE-ADJUSTED POWER-ON DATA RETENTION TIME TRACKING FOR SOLID STATE DRIVES

(71) Applicant: Dell Products L.P., Round Rock, TX (US)

(72) Inventors: Frederick K. H. Lee, Round Rock, TX (US); Girish B. Desai, Round Rock, TX (US); Samuel Hudson, Round Rock, TX (US); Robert J. Proulx, Round Rock, TX (US); Michael Rijo, Round Rock, TX (US); Leland W. Thompson, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 56 days.

(21) Appl. No.: 17/387,092

(22) Filed: Jul. 28, 2021

(65) Prior Publication Data

US 2023/0030620 A1 Feb. 2, 2023

(51) Int. Cl.
*G06F 12/00* (2006.01)
*G06F 3/06* (2006.01)

(52) U.S. Cl.
CPC ............ *G06F 3/0619* (2013.01); *G06F 3/064* (2013.01); *G06F 3/0634* (2013.01); *G06F 3/0652* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| | | | | |
|---|---|---|---|---|
| 2018/0314448 | A1* | 11/2018 | Grossman | G06F 3/064 |
| 2019/0384504 | A1* | 12/2019 | Galbraith | G06F 3/0653 |
| 2021/0141539 | A1* | 5/2021 | Vaysman | G06F 3/0658 |

* cited by examiner

*Primary Examiner* — Daniel D Tsui
(74) *Attorney, Agent, or Firm* — Chamberlain, Hrdlicka, White, Williams & Aughtry

(57) ABSTRACT

In general, embodiments of the invention relate tracking the operating temperature of the solid-state memory modules (SSMMs) in order to improve their performance.

20 Claims, 3 Drawing Sheets

TEMPERATURE-ADJUSTED POWER-ON DATA RETENTION TIME TRACKING FOR SOLID STATE DRIVES

BACKGROUND

Storage systems include multiple components. Many of these components, when performing various operations, generate heat. To ensure that the components are operating within expected temperature ranges, the storage systems typically manage the temperature of the components by dissipating the generated heat using, for example, fans and/or heat sinks.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Figure 1:
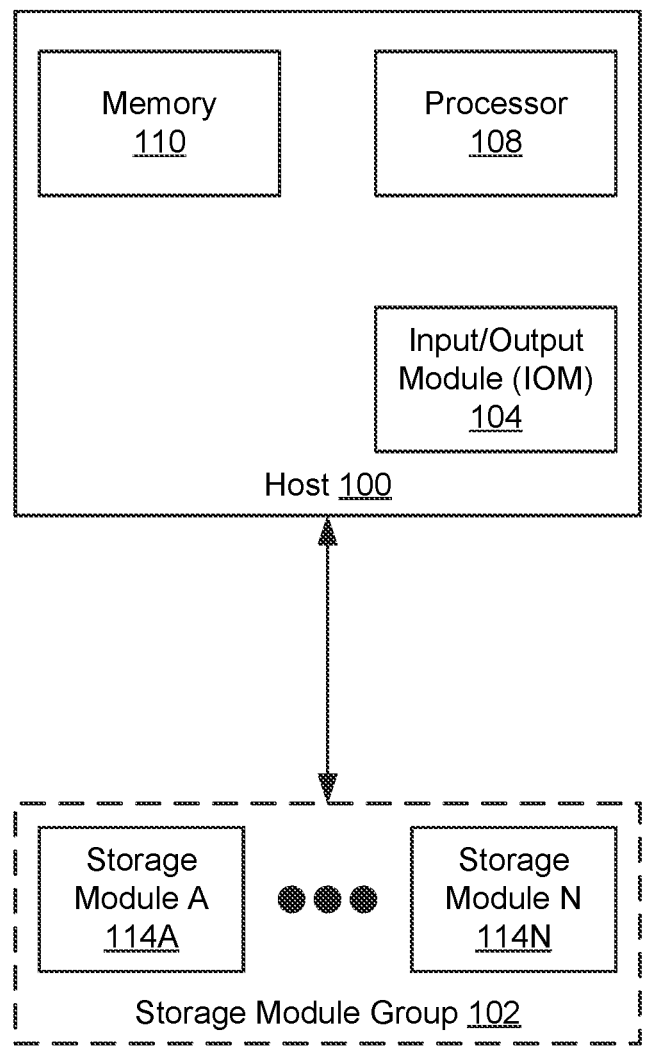
FIG. 1 shows a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

In general, embodiments of the invention relate tracking the operating temperature of the solid-state memory modules (SSMMs) in order to improve their performance. For example, the improvement in performance may more accurately determine when re-erasing operations should be conducted based on the operating temperature, which either reduces read errors after the, block is programmed, i.e., maintain data integrity, or reduces unnecessary re-erases, i.e., no wastage of P/E cycles and avoids unnecessary performance degradation.

With respect to maintaining data integrity, when data is written to solid-state memory (SSM), its integrity degrades the longer it is stored in the SSM and, at some point, the data (while successfully written to the SSM) cannot be successfully read from the SSM. To address this issue, the data is periodically subjected to a garbage collection operation in which the data is read from its current location and written to a new location. To ensure that the data is successfully read and re-written during the garbage collection operation, the storage module controller tracks how long the data has been stored in a given location (referred to as the retention time), and then perform a garbage collection operation on the data before the retention time exceeds an integrity threshold (which is specified in the same units as the retention time). In one embodiment of the invention, the integrity threshold is determined for a given program/erase (P/E) cycle and operating temperature.

Typically, the retention time for a piece of data stored in a block in the SSM, corresponds to the difference between the current time and the time that the data was stored in the block. The time may be represented as a series of cycles, e.g., one cycle is x minutes in duration (e.g., 1 cycle=10 minutes), or using any other mechanism for tracking how long a given piece of data has been stored in a block in the SSM.

In one or more embodiments of the invention, the integrity of the data for a given block is a function of the P/E cycle value of the block and the operating temperature of the block. The P/E cycle value may represent: (i) the number of P/E cycles that have been performed on the physical location (e.g., a block) defined by the physical address, or (ii) a P/E cycle range (e.g., 5,000-9,999 P/E cycles), where the number of P/E cycles that have been performed on the physical location defined by the physical address is within the P/E cycle range. In one embodiment of the technology, a P/E cycle is the writing of data to one or more pages in an erased block (i.e., the smallest addressable unit for erase operations, typically, a set of multiple pages) and the erasure of that block, in either order. in one embodiment of the technology, the P/E cycle values may be tracked on a per page basis, a per block basis, a per set of blocks basis, and/or at any other level of granularity.

Continuing with the discussion of the integrity threshold, as discussed above the integrity threshold to be used to determine whether to perform a garbage collection operation is determined for a particular P/E cycle value and operating temperature. Typically, the integrity thresholds are determined assuming a certain operating temperature of the SSM; however, if the SSM is operating at a temperature(s) that is different than the operating temperature on which the integrity threshold is based, the garbage collection operation may occur too late when the SSM is operating at a temperature that is greater than the default temperature that was used to set the integrity thresholds, or too early when the SSM is operating at a temperature that is lower than the default temperature that was used to set the integrity thresholds.

One or more embodiments of the invention address this issue by monitoring the actual operating temperature of the SSM, and modifying the retention time in a manner that takes into account the actual operating temperature (referred to a temperature modified retention time). For example, if the actual temperature of the SSM is greater than the default temperature, the temperature modified retention time will indicate that the data has been stored longer at the location than it actually has. By using a temperature modified retention time, the block may be garbage collected sooner than it would have been if only the retention time was used. In this manner, the data integrity is maintained in scenarios in which the operating temperature of the SSM is greater than the default temperature. As another example, if the actual temperature of the SSM is lower than the default temperature, the temperature modified retention time will indicate that the data has been stored for a shorter period of time at the location than it actually has. By using a temperature modified retention time, the, block may be garbage collected later than it would have been if only the retention time was used. In this manner, performance, which includes both throughput and latency, as well as endurance (i.e., the number of P/E cycles incurred), are improved in scenarios in which the operating temperature of the SSM is lower than the default temperature.

Returning to the discussion of erase bake, erase bake occurs in SSM in erased blocks that are not written to over a period of time. The longer a given block remains erased, the more charge it accumulates. This accumulated charge may lead. to read errors after the block has been programmed. To address this issue, the erased blocks need to be periodically re-erased (referred to as re-erase operation). The re-erasing of the block addresses the erase bake issue; however, the re-erasing results in increasing the P/E cycle value of the block.

To address this issue, the storage module controller tracks how long a given block has been erased (referred to as the erase time) and then performs a re-erase when the erase time exceeds an erase bake threshold (which is specified in the same units as the erase time). In one embodiment of the invention, the erase bake threshold is determined for a given operating temperature. Thus, similar to addressing the data integrity issue discussed above, embodiments of the invention implement a temperature modified erase time, which takes into account the operating temperature of the SSM. Thus, when the operating temperature is greater than the default temperature used to determine the erase bake threshold, then the re-erase operation occurs more frequently. However, when the operating temperature is less than the default temperature used to determine the erase bake threshold, then the re-erase operation occurs less frequently, which reduces the P/E cycles incurred as there are fewer re-erase operations being performed.

FIG. 1 shows a system in accordance with one or more embodiments of the invention. The system includes a host (100) and a storage module group (102). Each of these components is described below. In general, the host (100) is configured to manage the servicing of read and write requests from one or more applications (not shown) executing on the host. In particular, the host is configured to receive requests from one or more applications, to process the request (which may include sending the request to one or more storage modules in the storage module group), and to provide a response to the application after the request has been serviced.

Continuing with the discussion of FIG. 1, in one embodiment of the invention, the host (100) includes an Input/Output Module (IOM) (104), a processor (108), and a memory (110), In one embodiment of the invention, the IOM (104) is the physical interface between the host and the storage module group (102). The IOM supports one or more of the following protocols: PCI, PCIe, PCI-X, Ethernet (including, but not limited to, the various standards defined under the IEEE 802.3a-802.3bj), Infiniband, and Remote Direct Memory Access (RDMA) over Converged. Ethernet (RoCE). Those skilled in the art will appreciate that the IOM may be implemented using protocols other than those listed above without departing from the invention.

Continuing with FIG. 1 the processor (108) is a group of electronic circuits with a single core or multi-cores that are configured to execute instructions. In one embodiment of the invention, the processor (108) may be implemented using a Complex Instruction Set (CISC) Architecture or a Reduced Instruction Set (RISC) Architecture. The memory (110) is operatively connected to the processor (108). In one embodiment of the invention, the memory (110) corresponds to any volatile memory including, but not limited to, Dynamic Random-Access Memory (DRAM), Synchronous DRAM, SDR SDRAM, and DDR SDRAM.

In one embodiment of the invention, the storage module group (102) includes one or more storage modules (114A, 114N) each configured to store data. One embodiment of a storage module is described below in FIG. 2.

Figure 2:
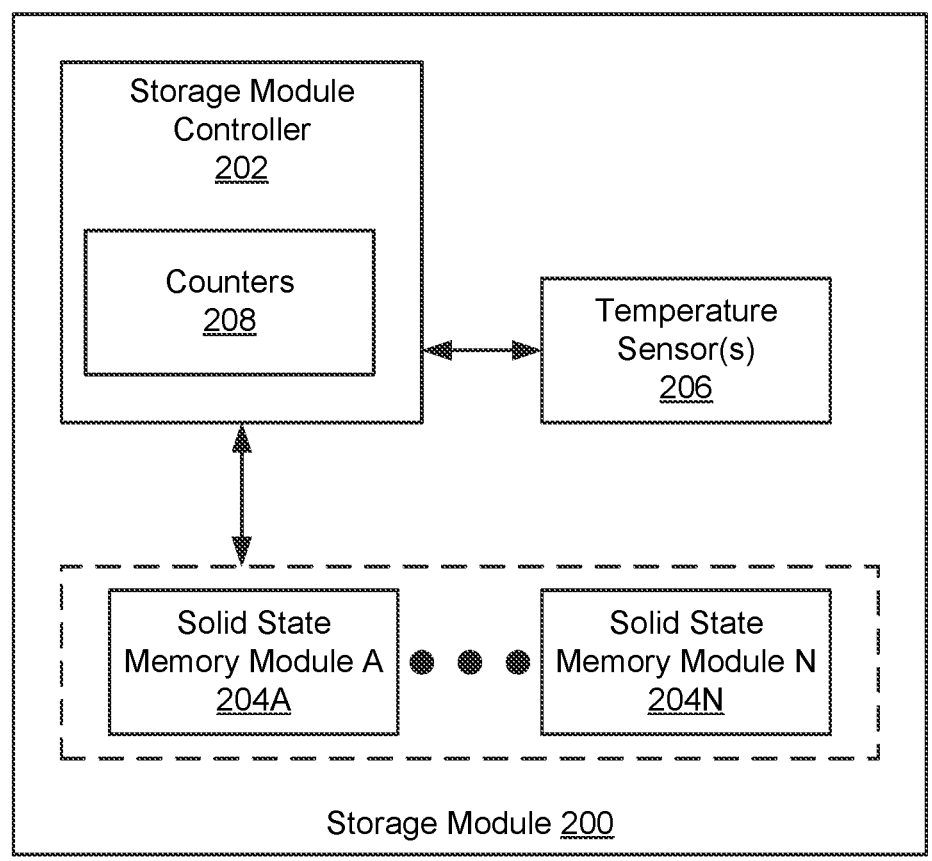
FIG. 2 shows a storage module with one or more embodiments of the invention.

FIG. 2 shows a storage module with one or more embodiments of the invention. The storage module (200) includes a storage module controller (202), memory (not shown), one or more temperature sensors(s) (206) and one or more solid-state memory modules (204A, 204N), Each of these components is described below.

In one embodiment of the invention, the storage module controller (202) is configured to receive, read, and/or write requests from the host (100, FIG. 1). Further, the storage module controller (202) is configured to service the read and write requests using the memory (not shown) and/or the solid-state memory modules (204A, 204N).

Further, the storage module controller (202) includes counters which track counter values associated with each block, sets of blocks or any combination thereof. The counter values correspond to temperature modified retention times or temperature modified erase bake times. The blocks that include data are associated with temperature modified retention times, while the erased blocks are associated with temperature modified erase times. The counters may be implemented using any combination of hardware and/or software, and by using any known or later discovered data structure. Further, while FIG. 2 shows that counters are located within the storage module controller, the counters may be located in the storage module but external to the storage module controller without departing from the invention. Additional detail about the counter values is described below in FIG. 3.

In one or more embodiments of the invention, the storage module controller is configured to the method shown in FIG, 3.

In one embodiment of the invention, the memory (not shown) corresponds to any volatile memory including, but not limited to, Dynamic Random-Access Memory (DRAM), Synchronous DRAM, SDR SDRAM, and DDR SDRAM.

In one embodiment of the invention, the solid-state memory modules correspond to any data storage device that uses solid-state memory to store persistent data. In one embodiment of the invention, solid-state memory may include, but is not limited to, NAND Flash memory and NOR Flash memory, Further, the NAND Flash memory and the NOR flash memory may include single-level cells (SLCs), multi-level cell (MLCs), or triple-level cells (TLCs). Those skilled in the art will appreciate that embodiments of the invention are not limited to storage class memory.

In one embodiment of the invention, the temperature sensor(s) (206) is located within the storage module and operatively connected to the storage module controller (202). The temperature sensor(s) (206) is used to determine the internal temperature of the storage module and/or the temperatures of one or more SSMMs. The temperature sensor(s) may provide the temperature information to the storage module controller (202), The temperature sensor(s) (206) may be any type of sensor that is suitable to monitor temperature as described above.

Figure 3:
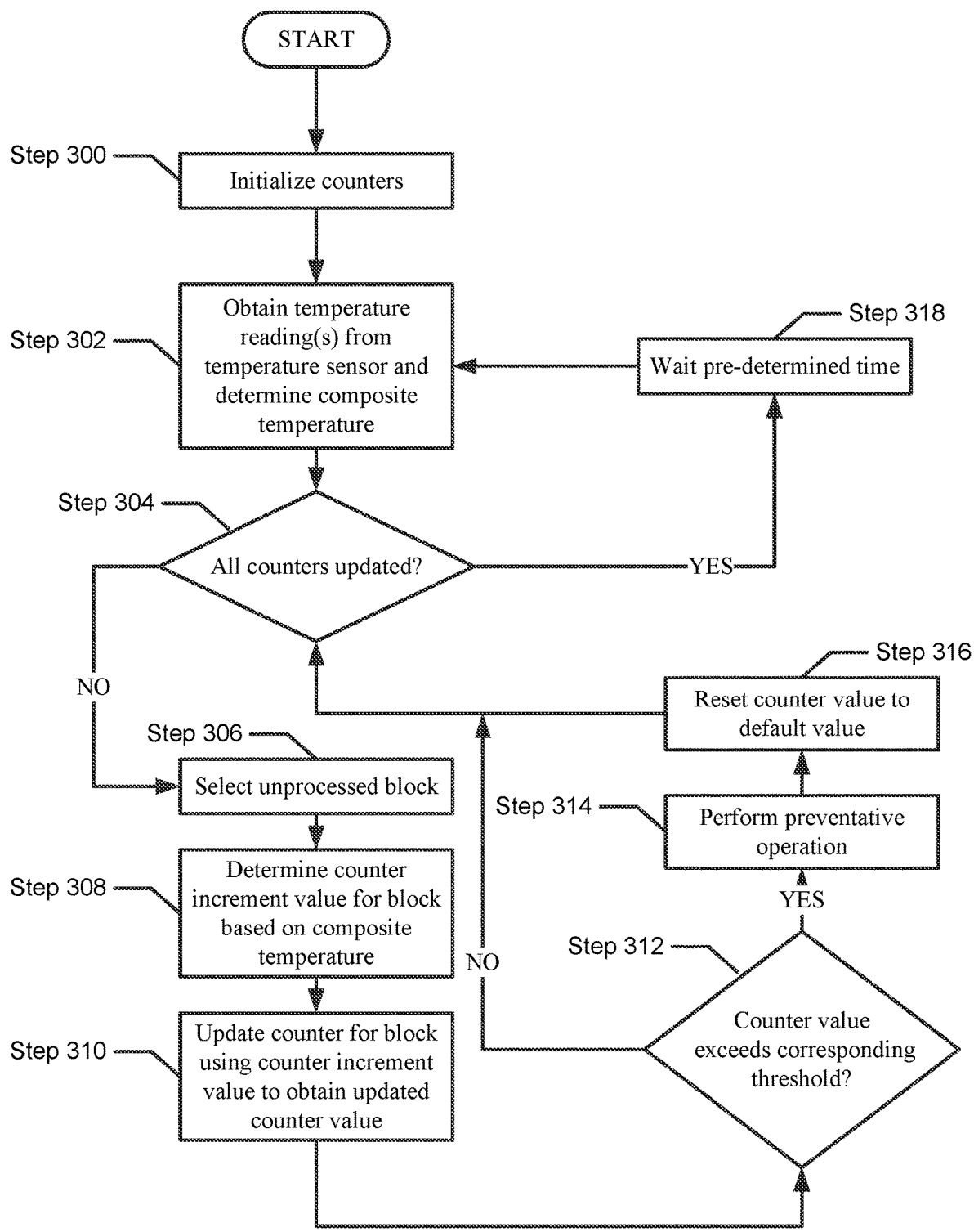
FIG. 3 shows a method to protect the integrity of the storage modules in accordance with one or more embodiments of the invention.

FIG. 3 shows a flowchart of a method in accordance with one or more embodiments of the invention. The method depicted in FIG. 3 may be performed to protect the integrity of the data stored in the storage modules in accordance with one or more embodiments of the invention. The method shown in FIG, 3 may be performed by, for example, a storage module controller (e.g., 202, FIG. 2). Other components of the system in FIG. 1 or 2 may perform all, or a portion, of the method of FIG. 3 without departing from the invention.

While FIG. 3 is illustrated as a series of steps, any of the steps may be omitted, performed in a different order, additional steps may be included, and/or any or all of the steps may be performed in a parallel and/or partially overlapping manner without departing from the invention.

In step 300, the counters in the storage module are initialized to a default value. The default value may be zero or any other starting value.

In step 302, one or more temperature readings are obtained from the internal temperature sensors and used to generate a composite temperature. In scenarios in which there is only one temperature sensor, a single temperature reading may be taken directly as the composite temperature, or multiple temperature readings may be taken over a period of time and then averaged to generate a composite temperature. in scenarios in which there are multiple temperature sensors, a single temperature reading may be taken from each sensor to determine a composite temperature, or multiple temperature readings may be continuously obtained from each of the sensors (e.g., every minute) and then an average of the most recent k temperature readings per temperature sensor is used to obtain a composite temperature periodically (e.g., every 10 minutes). Other methods for deriving the composite temperature from the temperature readings may be performed without departing from the invention.

Following step 302, the storage module controller then performs steps 304-316 to update the counters, or more specifically, the counter values of the counters and then (as appropriate) performs preventative operations based on the updated counter values. Once all counter values have been updated and the preventative operations (if any) have been performed, the storage module controller waits a pre-determined period of time, and then performs steps 302-316 again.

Turning to step 304, a determination is made about whether all blocks (or all relevant blocks) are processed. If all blocks are processed, the process proceeds to step 318; otherwise, the process proceeds to step 306. In certain scenarios, some blocks may not be processed in step 304 (i.e., in the scenario which the block is not deemed relevant to process). One non-limiting example of a non-relevant block that is not processed is a block that is currently in the processing of servicing a write request. In this scenario, the aforementioned block may not be processed or processed at another point in time (i.e., after the write request has been serviced).

In step 306, an unprocessed block is selected. A block is an unprocessed block when the counter value associated with the block has not been updated after the composite temperature has been obtained in step 302.

In step 308, the counter increment value for the block selected in step 306 is determined based on the composite temperature. More specifically, as discussed above, the counter value corresponds to either a temperature modified retention time (for blocks with data) or a temperature modified erase bake time (for erased blocks). If the composite temperature value equals the default temperature then the counter increment value is set as the default counter increment value (e.g., 1). If the composite temperature value is greater than the default temperature, the counter increment value is set to a value that is greater than the default counter increment value. The specific value of the counter increment value is determined as a function of the difference between the composite temperature value and the default temperature value. The function may be a linear function, the function may be a geometric function, or any other type of function.

In one embodiment of the invention, the effect of the composite temperature on the solid state memory module may be quantified using the Arrhenius function, $k=A \exp(-Ea/RT)$, where k=rate constant, A=scaling factor, Ea=activation energy in electron Volts (eV). which changes based on the solid state memory module type, $R=8.6171e-5$ (eV/K)=Boltzmann's constant, and T=absolute temperature in degrees Kelvins (K), where 0 K=−273.15C (degrees Celsius). The invention is not limited to the use of the Arrhenius function.

In one embodiment of the invention, the storage module controller may include a lookup table that is derived using one of the aforementioned functions. The lookup table includes a listing of composite temperatures and the corresponding counter increment values (see example below). Depending on the implementation of the invention, the storage module controller may include one or more lookup tables. If there are multiple lookup tables, then each lookup table may be associated with a specific type of solid state memory module.

Continuing with the discussion of FIG. 3, in step 310, the counter value is updated with the counter increment value to obtain an updated counter value.

In step 312, a determination is made about whether the updated counter value exceeds a corresponding threshold. For example, if the block is storing data, then the updated counter value may be compared to an integrity threshold; however, if the block is an erased block, then the updated counter value may be compared to an erase bake threshold. In addition to selecting the appropriate type of threshold (e.g., integrity or erase bake), the specific threshold that is used in the determination in step 312, is also based on the current P/E cycle value of the block. Similar to the lookup table(s) discussed above that includes a mapping between counter increment value and composite temperature, the storage controller module may also include one or more lookup tables that specify the P/E value, and the corresponding threshold(s).

Continuing with the discussion of step 312, if the updated counter value exceeds a corresponding threshold, the process proceeds to step 314; otherwise, the process proceeds to step 304.

In step 314, a preventative operation is performed. If the block is storing data, then a garbage collection operation is performed to read the data from the block, and to write the data to a new (currently erased) block. If the block is an erased block, then a re-erase operation is performed on the block. The re-erase operation removes any accumulated charge in the block. Other preventative operations may be performed as an alternative to, or in addition to, the aforementioned preventative operations. Non-limiting examples of these preventative operations include, changing the read voltage(s) for a block, modifying the time when a partially-filed block should be closed.

In step 316, once the preventative operation is performed, the counter value for the block is reset to a value, which may be the default value or another value. Further, in the case where step 314 included a garbage collection operation, the counter value of the new block (i.e., the block to which data from the block was written) is also set to the default value.

In step 318, the storage module controller waits a pre-determined period of time and then returns to step 302. The threshold values may be derived from the duration of the pre-determined time. An example of the pre-determined time is provided below.

While FIG. 3 describes various embodiments of the invention with respect to starting at a default value and then incrementing a counter until a threshold is reached, embodiments of the invention may be implemented by setting the counter value to an appropriate threshold value and then decrementing the counter at the pre-determined time intervals. The counter decrement value may be determined the same way that the counter increment value is determined; however, instead of adding the determined value to the counter, the value is decremented from the counter. Once the counter reaches zero (or another pre-determined value), then a preventative operation is performed.

Example

The following section describes a non-limiting example in accordance with one or more embodiments of the invention. Consider a scenario in which the storage module includes NAND flash with a P/E cycle value of 7000 and is configured to perform the method shown in FIG. 3. When the NAND flash is operating at its default temperature, e.g., 40° C., the data in a given block needs to be garbage collected every 30-days when the P/E cycle value is 7000. In this example assume that the pre-determined time period is ten minutes (i.e., steps 302-316 are performed every ten minutes) and that the default counter increment value is one. This means that the integrity threshold should be set to 4320 (6 iterations of steps 302-316 per hour*24 hours per day*30 days).

However, if the composite temperature of the NAND flash is higher than 40° C., the counter increment value is greater than one. The following is an exemplary lookup table that maps composite temperature to counter increment values.

TABLE 1

Lookup Table

| Temperature | Counter Increment Value |
| --- | --- |
| 82 | 81 |
| 80 | 70 |
| 78 | 60 |
| 76 | 51 |
| 74 | 41 |
| 72 | 32 |
| ... | ... |
| 46 | 3 |
| 44 | 2 |
| 42 | 2 |
| 40 or below | 1 |

Though not shown in Table 1, there may be certain scenario in which the counter increment value may be less than one when the temperature is below the default value. Further, there may be scenarios in which the counter increment value is greater than one when the temperature is the default temperature in these scenarios, the counter increment value when the temperature is less than the default value may be greater than one.

Using the above lookup table, consider the following two scenarios.

Scenario 1

The NAND flash operates at a constant temperature of 72° C. In this scenario, the default counter value is 1. Further, based on the above table, the counter increment value at each ten minute interval is 32. Thus, the counter value for a block in the NAND flash operating at 72° C. will reach 4320 in 22.5 hours (i.e., (4320−1)/(32*6)). Thus, instead of waiting 30-days to be garbage collected, the block is garbage collected after 22.5 hours, which reflects that as the temperature of NAND increases, there is a decrease in integrity of the data and, as such, it needs to be garbage collected sooner (relative to when it would need to be garbage collected if it was operating at a temperature of 40°C).

Scenario 2

The NAND flash operates at a constant temperature of 82° C. for five hours and then operates at a temperature of 72° C. thereafter. In this scenario, the default counter value is 1. Further, based on the above table, the counter increment value at each ten minute interval is 81 when the temperature is 82° C. and the counter increment value at each ten minute interval is 32 when the temperature is 72° C. Thus, the counter value for a block in the NAND flash operating under the aforementioned temperature conditions will reach 4320 in 14.8 hours (i.e., 5+(4320−1−5*6*81)/(32*6)). Thus, instead of waiting 30-days to be garbage collected, the block is garbage collected after 14.8 hours, which reflects that as the temperature of NAND increases, there is a decrease in integrity of the data and, as such, it needs to be garbage collected sooner (relative to when it would need to be garbage collected if it was operating at a temperature of 40° C. or even at 72° C.).

End of Example

One or more embodiments of the invention relate to taking the actual operating temperature into account in order to perform garbage collection operations and/or re-erase operations at more appropriate times, thereby improving the data integrity and overall performance of the SSMM.

The problems discussed above should be understood as being examples of problems solved by embodiments of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention, Accordingly, the scope of the invention should be limited only by the attached claims.

What is claimed is:

1. A method for managing a solid state memory module, the method comprising:
   obtaining a temperature reading for the solid state memory module;
   determining a counter increment value for a counter, wherein the counter is associated with a block in the solid state memory module, and wherein the counter increment value is determined using the temperature reading;
   updating a counter value for the counter using the counter increment value to obtain an updated counter value;
   making a determination that the updated counter value exceeds a threshold; and
   in response to the determination, performing a preventative operation.

2. The method of claim 1, further comprising:
   resetting the counter after the preventative operation is performed to a default value.

3. The method of claim 1,
   wherein the block comprises data; and
   wherein the updated counter value is a temperature modified retention time for the block.

4. The method of claim 3,
   wherein the threshold is an integrity threshold; and
   wherein the preventative operation is a garbage collection operation.

5. The method of claim 1,
   wherein the block is an erased block; and
   wherein the updated counter value is a temperature modified erase time for the block.

6. The method of claim 5,
   wherein the threshold is an erase bake threshold; and
   wherein the preventative operation is a re-erase operation.

7. The method of claim 1, wherein the threshold is determined using a default temperature and the temperature reading is above or below the default temperature.

8. The method of claim 1, wherein the temperature reading is a composition temperature reading derived from two or more separate temperature readings associated with the solid state memory module.

9. A storage module, comprising:
   a storage module controller;
   a plurality of solid state memory modules; and
   a plurality of temperature sensors,
   wherein the storage module controller is configured to:
      obtain a composition temperature reading for a solid state memory module of the plurality of solid state memory modules based on plurality of temperature readings from the plurality of temperature sensors;
      determine a counter increment value for a counter, wherein the counter is associated with a block in the solid state memory module and wherein the counter increment value is determined using the composite temperature reading;
      update a counter value for the counter using the counter increment value to obtain an updated counter value;
      make a determination that the updated counter value exceeds a threshold;
      in response to the determination, perform a preventative operation; and
      reset the counter after the preventative operation is performed.

10. The storage module of claim 9,
    wherein the block comprises data; and
    wherein the updated counter value is a temperature modified retention time for the block.

11. The storage module of claim 10,
    wherein the threshold is an integrity threshold; and
    wherein the preventative operation is a garbage collection operation.

12. The storage module of claim 9,
    wherein the block is an erased block; and
    wherein the updated counter value is a temperature modified erase time for the block.

13. The storage module of claim 12,
    wherein the threshold is an erase bake threshold; and
    wherein the preventative operation is a re-erase operation.

14. The storage module of claim 9, wherein the threshold is determined using a default temperature and the composite temperature reading is above or below the default temperature.

15. A non-transitory computer readable medium comprising computer readable program code to:
    obtain a temperature reading for a solid state memory module;
    determine a counter increment value for a counter, wherein the counter is associated with a block in the solid state memory module and wherein the counter increment value is determined using the temperature reading;
    update a counter value for the counter using the counter increment value to obtain an updated counter value;
    make a determination that the updated counter value exceeds a threshold, wherein the threshold is determined using an default temperature and the temperature reading is above the default temperature; and
    in response to the determination, perform a preventative operation.

16. The non-transitory computer readable medium of claim 15, wherein the computer readable program code further:
    resets the counter after the preventative operation is performed.

17. The non-transitory computer readable medium of claim 15,
    wherein the block comprises data; and
    wherein the updated counter value is a temperature modified retention time for the block.

18. The non-transitory computer readable medium of claim 17,
    wherein the threshold is an integrity threshold; and
    wherein the preventative operation is a garbage collection operation.

19. The non-transitory computer readable medium of claim 15,
    wherein the block is an erased block; and
    wherein the updated counter value is a temperature modified erase time for the block.

20. The non-transitory computer readable medium of claim 19,
 wherein the threshold is an erase bake threshold; and
 wherein the preventative operation is a re-erase operation.

\* \* \* \* \*